United States Patent [19]

Schenk

[11] Patent Number: 4,937,813
[45] Date of Patent: Jun. 26, 1990

[54] SYSTEM FOR CANCELLING ECHO SIGNALS

[75] Inventor: Heinrich Schenk, Munich, Fed. Rep. of Germany

[73] Assignee: Siemens Aktiengesellschaft, Berlin and Munich, Fed. Rep. of Germany

[21] Appl. No.: 156,504

[22] Filed: Feb. 16, 1988

[30] Foreign Application Priority Data

Feb. 18, 1987 [DE] Fed. Rep. of Germany ....... 3705174

[51] Int. Cl.$^5$ .............................................. H04B 3/23
[52] U.S. Cl. ................................... 370/32.1; 379/410
[58] Field of Search ....................... 379/406, 410, 411; 370/32, 32.1

[56] References Cited

U.S. PATENT DOCUMENTS

| 4,464,746 | 8/1984 | Snijders et al. | 370/32.1 |
| 4,695,998 | 9/1987 | Schollmeier et al. | 370/32.1 |
| 4,760,596 | 7/1988 | Agrawal et al. | 379/410 |

FOREIGN PATENT DOCUMENTS

| 0044598 | 1/1982 | European Pat. Off. | 379/411 |
| 0152172 | 8/1985 | European Pat. Off. | |
| 0177239 | 4/1986 | European Pat. Off. | |
| 0192359 | 8/1986 | European Pat. Off. | 379/411 |
| 0203726 | 12/1986 | European Pat. Off. | |
| 8301715 | 5/1983 | Int'l Pat. Institute | |

OTHER PUBLICATIONS

"Large-Scale Integration of Hybrid-Method Digital Subscriber Loops", Agazzi et al., IEEE Transactions on Comm., vol. COM30, No. 9, Sep. 1982, pp. 2095-2108.

van Gerwen et al.; "Ein Integrierter Echokompensator zur Basisband-Datenübertragung"; Philips Technische Rundschan 39, 1980/81; pp. 82-98. (no translation).

Agazzi et al.; "Nonlinear Echo Cancellation of Data Signals"; IEEE Transactions on Communications, vol. COM-30, No. 11, Nov. 1982; pp. 2421-2433.

Cesar-Corredera et al.; "Data Echo Nonlinear Cancellation"; ICASSP 85, 32.4.1, Mar. 1985; pp. 1245-1248.

Holte et al.; "A New Digital Echo Canceler for Two--Wire Subscriber Lines"; IEEE Transactions on Communications, vol. COM-29, No. 11, Nov. 1981; pp. 1573-1581.

*Primary Examiner*—Jin F. Ng
*Assistant Examiner*—Randall S. Vaas
*Attorney, Agent, or Firm*—Jeffrey P. Morris; David N. Caracappa

[57] ABSTRACT

An adaptive compensator circuit is provided which includes a first echo compensator, responsive to data signals from the transmitter, for providing a first compensation signal for compensating an echo signal component which is linearly related to the digital signals to be transmitted. A second echo compensator, responsive to both the first compensation signal and the corrected received signal provides a second compensation signal for compensating the nonlinear echo signal component. An adder, responsive to the first and second echo compensation signals, provides a summed compensation signal. The data signals from the receiver are corrected by means of the summed compensation signal. In another embodiment, the second echo compensator is responsive to both the corrected received signal and the current symbol being transmitted by the transmitter and the (N−1) preceding symbols.

11 Claims, 4 Drawing Sheets

SYSTEM FOR CANCELLING ECHO SIGNALS

BACKGROUND OF THE INVENTION

1. Field of the Invention

This invention relates to a system for cancelling echo signals which occur during transmission of digital signals in a duplex channel system over a two-wire line. The system includes a transmitter for emitting digital signals to the two-wire line, a receiver that picks up digital signals from the two-wire line, and an adaptive compensation circuit for producing compensation signals which compensate for the echo signals which are picked up by the receiver in addition to the received digital signals. The compensation circuit supplies the compensation signals to the receiver in response to transmitted data and echo-compensated received digital signals from said receiver.

2. Description of the prior Art

One form of echo cancelling system is known from, for example, "Philips Technische Rundschau", 39, 1980/81, No. 3, Pgs. 82-98. In this system, the compensation circuit is arranged as an adaptive transversal filter, and is especially suitable for compensation of echo signals that are linearly related to the digital signals to be transmitted. This type of compensation requires considerable circuit complexity.

Examples of compensation circuits for echo signals which are nonlinearly related to the digital signals to be transmitted are described in "IEEE Transactions on Communications", VOL. COM-30, No. Nov. 11, 1982, Pgs. 2421-2433. A first example of a compensation circuit works in accordance with a so called memory compensation principle. According to this principle, compensation signals corresponding to all of possible combinations of N successive digital signal states which may be transmitted are stored in a memory. The memory is addressed upon each transmission of a signal state, in order to generate the corresponding compensation signal corresponding to the current signal state and the (N−1) previously transmitted signal states. With such a compensation circuit, nonlinearities in the echo signals may be compensated. However, the response time of the compensation circuit depends upon the total number of combinations of said N successive signal states that must be considered.

A second example of a compensation circuit is based upon a conventional linear echo compensator, including, for example, a transversal filter, but also including additional compensating stages corresponding to the nonlinearities in the echo signals that must be considered. Such a compensation circuit has a more favorable response than the memory-based compensation circuit. However, the response of the section of the compensation circuit compensating for the linear echo signal portion of the received signal may be affected by the nonlinearities in the echo signal. For example, in a case, in which the main component of an echo signal is a linear echo, the minor nonlinearities still affect the response of the compensation circuit.

A compensation circuit is desired that can effectively compensate for echo signals with both a linear and a nonlinear signal component and provide a favorable response characteristic.

An example of a nonlinear echo compensation circuit consists of a series connection of a linear echo compensator and a nonlinear echo compensator. Because of this separation, the response of the linear echo compensator is largely independent of the nonlinearities in echo signals that must be considered.

SUMMARY OF THE INVENTION

In accordance with principles of the present invention, an adaptive compensator circuit includes a first echo compensator, responsive to data signals from the transmitter, for providing a first compensation signal for compensating an echo signal component which is linearly related to the digital signals to be transmitted. A second echo compensator, responsive to the first compensation signal and the echo corrected received digital signal provides a second compensation signal for compensating the nonlinear echo signal component. An adder, responsive to the first and second echo compensation signals, provides a summed compensation signal to the receiver. The data signals from the receiver are corrected by means of the summation compensation signal.

By separating the linear and nonlinear echo compensators, the response of the linear echo compensator, which generally compensates the main component of the echo signals, is largely independent of the nonlinear echo signal components. By this method it becomes possible to ensure that, using a suitable linear echo compensator, the compensator circuit will rapidly assume its steady state relative to the main component of the echo signal. Thus, a quick rough adjustment of the compensation signal ensues, while the fine adjustment of the compensation signals is performed as a function of the nonlinearities occurring in the echo signals. A further advantage of the invention is that, depending on the cause and point of origin of the nonlinearities occurring in the echo signals, one or several independent nonlinear echo compensators may be used.

For example, if the transmitter has an output stage causing nonlinearities in the echo signals, the input of this output stage may be coupled to the first (linear) echo compensator, and the output to the second (nonlinear) echo compensator. This makes it possible to cancel the nonlinearities occurring in the output stage.

As a further example, nonlinearities may be caused by an input stage (e.g., A/D converter) of the receiver. These nonlinearities may be compensated by coupling the output of this input stage to the second echo compensator. This arrangement will cancel nonlinearities which may be caused by the input stage.

DESCRIPTION OF THE PREFERRED EMBODIMENT

Figure 1:
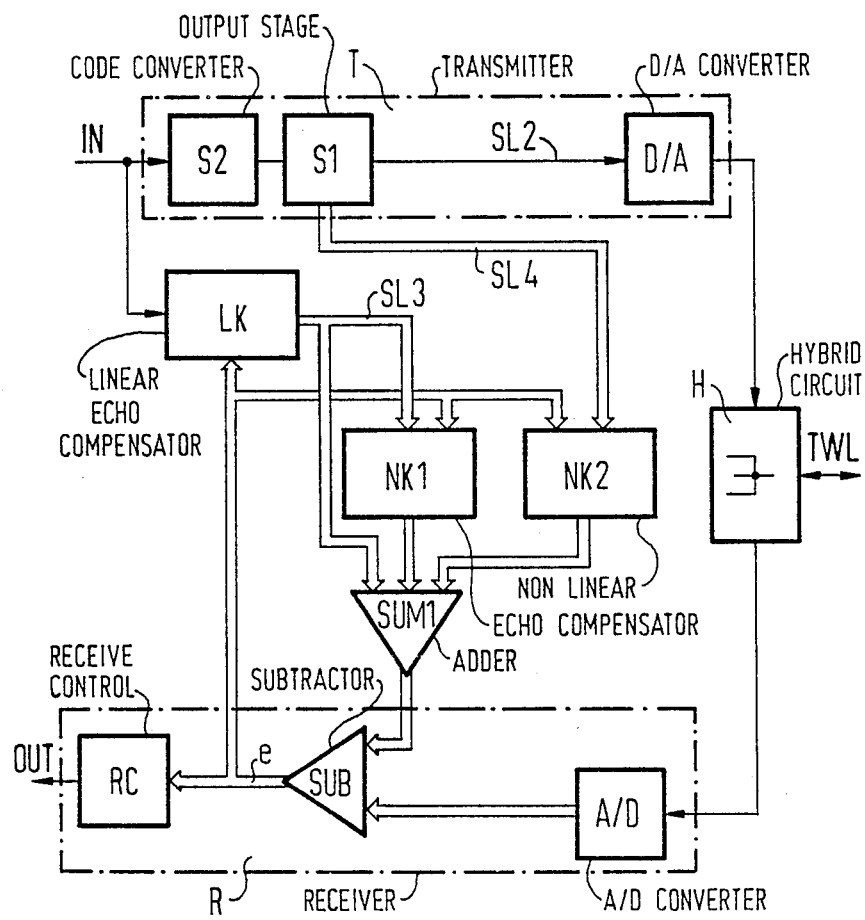
FIG. 1 is a block diagram of a data transmission system including a compensator circuit in accordance with the present invention.

FIG. 1 shows a block diagram of a transmission facility for transmitting digital signals in the duplex channel system via a two-wire line TWL. In FIG. 1, thin lines represent wires carrying either analog signals or single bit digital signals. Thick lines represent wires carrying multibit parallel digital signals This block diagram includes just the circuit elements necessary for understanding the invention in question. The digital signals may be any type of multilevel signal, e.g. binary signals or pseudo-ternary signals which are applied frequently in transmission of this type.

The transmission facility is provided with a transmitter T which converts the transmission signals occurring in an input transmission line IN from, for example, a data station (not shown), into digital signals suitable for transmission via the two-wire line TWL. Such a conversion may consist of, for example, a power amplification of the binary signals from the data station and their subsequent conversion into analog signals. For this purpose, the transmitter T is provided with an output stage designated S1, which is coupled to a digital-/analog converter D/A via a line SL2. If, on the other hand, the binary signals emitted by the data station are to be transmitted as multilevel signals varying from the binary signals, for example, as pseudo-ternary signals, a suitable code converter S2 can be connected before said output stage S1, as indicated in FIG. 1.

The analog signals occurring at the output terminal of said A/D converter are transmitted as transmitted signals via a hybrid circuit H to the two-wire line TWL. At the same time, the hybrid circuit H accepts the analog signals received by the transmission facility shown in FIG. 1 as received signals and supplies the received signals to a receiver R. In addition to the received data signals, receiver R also receives noise, signals, designated as echo signals, through the hybrid circuit H. The noise signals occur at the receiver during the emission of transmit signals, either direct through the hybrid, due to an incomplete decoupling of the transmission channel, or from reflection points in the two-wire line. The receiver thus receives not only the actual received signals, but also a mixture of signals formed by the received signals and the echo signals. Receiver R includes an analog/digital converter A/D, a subtracter SUB, which is coupled to the output terminal of the A/D converter, and a receive control RC coupled to the output terminal of the subtracter SUB. The A/D converter samples the mixture of signals, from hybrid circuit H and converts the samples into correspondingly coded bit groups which occur at the multibit parallel output terminal of the A/D converter. These individual bit groups, representing samples of the mixture of received signals, is coupled to a first input terminal of subtracter SUB. A second input terminal of subtracter SUB receives a corresponding bit group as a compensation signal. The compensation signal bit groups contain an estimate of what the actual received echo signal component will be. The output of the subtracter SUB, thus, contains the received signal component which corresponds with the received signal with the echo signal component minimized. The echo corrected received signal is coupled to the receiver control circuit RC from the subtracter SUB. The output signal OUT from the receiver control circuit RC is coupled to the data station via a receive line OUT.

In the exemplified embodiment illustrated in FIG. 1, it is assumed that the multibit digital signals are transmitted between said circuit elements via multibit parallel wires and are processed in parallel within the respective circuit elements. It is also possible to transmit the multibit digital signals serially between the individual circuit elements and to process them in bit serial form within said circuit elements.

The transmission facility shown in FIG. 1 is provided with a compensator configuration for generating compensation signals. The compensator configuration consists overall of three separate echo signal compensators. A first echo compensator LK has a first input terminal coupled to the input line IN, and, according to the digital signals (transmitted signals) transmitted via the line IN, forms compensation signals that are linearly related to the transmitted signals. Echo compensators of this type and their function are already known, and thus do not require further elaboration. With respect to these echo compensators, it need only be pointed out here that, in the present exemplified embodiment, the echo compensator produces parallel multibit digital signals as compensation signals and supplies them over parallel data lines SL3.

A second echo compensator NK1 has a first input terminal coupled to the output terminal of linear echo compensator LK via data lines SL3. In response to the compensation signals from the first echo compensator LK, the second echo compensator NK1 generates signals for compensating echo signals which are nonlinearly related to the signals to be transmitted.

In addition, a third echo compensator NK2 is also provided. Echo compensator NK2 has a first input terminal coupled to an output terminal of the output stage S1 of the transmitter T, via a parallel line SL4, and produces signals for compensating echo signals which are also nonlinearly related to the signals to be transmitted.

The three echo compensators (LK, NK1, and NK2) all produce multibit digital signals in a parallel form. The compensation signals produced are coupled to respective input terminals of an adder SUM1 which forms a summation compensation signal from the individual compensation signals. The summation compensation signal is coupled to a second input terminal of subtracter SUB in the receiver R.

The series connection of the linear echo compensator LK and the nonlinear echo compensator NK1, can compensate for both linear echo signal components and nonlinear echo signal components produced by the input stages of the receiver R, e.g. by the analog/digital converter A/D shown in FIG. 1. On the other hand, the nonlinear echo compensator NK2 permits compensation of the nonlinear echo signal component introduced by output stage S1 of the transmitter S. The series connection of the linear echo compensator LK and the nonlinear echo compensator NK1, and the nonlinear echo compensator NK2 may be coupled to other circuit elements of the transmitter T, depending on the point of origin of the nonlinear echo signal segments. In addition, it is also possible to use only one of the two nonlinear echo compensators, e.g., the nonlinear echo compensator NK1, when the nonlinear echo signal components originate primarily at the input stages of the receiver. On the other hand, if the nonlinear echo signal components are caused primarily by output stage S1 of the transmitter S, then only the nonlinear echo compensator NK2 may be supplied.

With respect to the production of compensation signals, the three echo compensators (LK, NK1, NK2) may be adjustably adaptive For this purpose, said compensators may each have second input terminals coupled to the output terminal of the subtracter SUB.

In all description below, it is assumed that the transmitted signals are binary signals and that output stage S1 of the transmitter T includes a serial-parallel converter, in the form of, for example, a shift register with N parallel outputs. In addition, the linear echo compensator LK generates an N-bit compensation signal upon each bit transmission.

Figure 2:
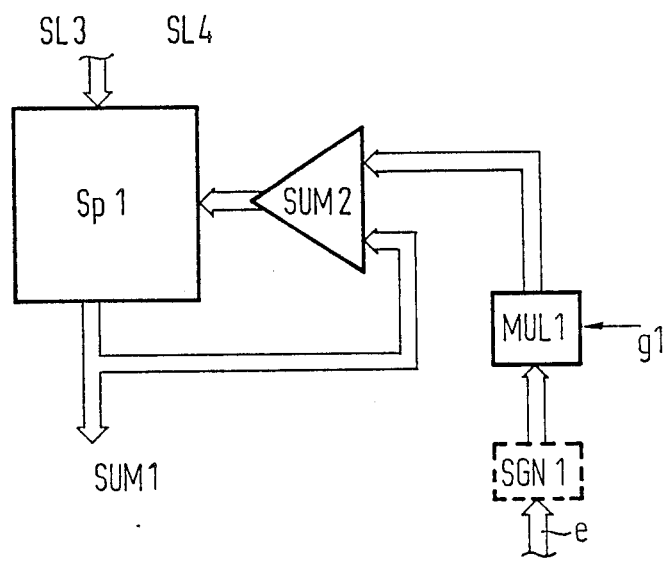
FIG. 2 is a block diagram of a first exemplified embodiment of a nonlinear echo compensator.

FIG. 2 shows an exemplified embodiment of a nonlinear echo compensator which may be used for compensators NK1 or NK2 (in FIG. 1). This echo compensator, operates similarly to the known storage method described above. The echo compensator of FIG. 2 includes a memory circuit MEM, having a plurality of memory locations in which compensation signals are stored. One compensation signals is allocated to each possible combination of the bit groups supplied by output stage S1 (for NK2) or by the linear echo compensator LK (for NK1). With respect to NK1 or NK2, there is a difference from the known storage method: in the stored nonlinear compensation signals, the echo signal component linearly related to the signals to be transmitted, are not taken into consideration.

The digital signal supplied to the echo compensator serves as the address signals for the memory MEM. The storage location containing the compensation signal allocated to the present digital transmitter signal is selected in response to that signal. The signal from the DATA output terminal of memory MEM forms the compensation signal supplied to adder SUM1.

The echo compensator shown in FIG. 2 also includes a circuit for the adaptive adjustment of the individual compensation signals stored in the memory MEM. The echo compensator performs the adaptive adjustment according to the equation:

$$Y_i(new) = Y_i(old) + gl \times e \quad (1)$$

Where $Y_i$ is the i-th comPensation signal which is to be adjusted, gl a constant which determines the response of the echo compensator and e is the corrected received signal occurring at the output of the subtracter SUB1 shown in FIG. 1. A signal having a value corresponding to equation (1) is provided by an adder SUM2.

A first input terminal of adder SUM2 receives the compensation signal (designated $Y_i$(old)) from the data output terminal of memory MEM. The signal e from the output terminal of the subtracter SUB (of FIG. 1) is multiplied in the multiplier MUL1 by a constant valued signal gl. The output terminal of adder SUM2 produces the updated compensation signal $Y_i$ (new) which is coupled to the data input terminal of memory MEM. The stored compensation signal ($Y_i$(old)) is overwritten by the newly adjusted compensation signal ($Y_i$ (new)) which is stored in the location of the memory MEM which corresponds to the current input signal. As a variation equation (1), it is adequate for an adaptive adjustment if only the sign of e signal is taken into consideration. In such a case, a circuit designated as SGN1 and shown in phantom in FIG. 2 may, for the purpose of sign determination, be connected before the multiplier MUL1. In this configuration, the signal supplied to adder SUM2 from the multiplier MUL1 is either gl or −gl dependinq upon the sign of the e signal. Accordingly circuit SGN1 produces a +1 signal if the e signal is positive and a −1 signal if the e signal is negative.

Figure 3:
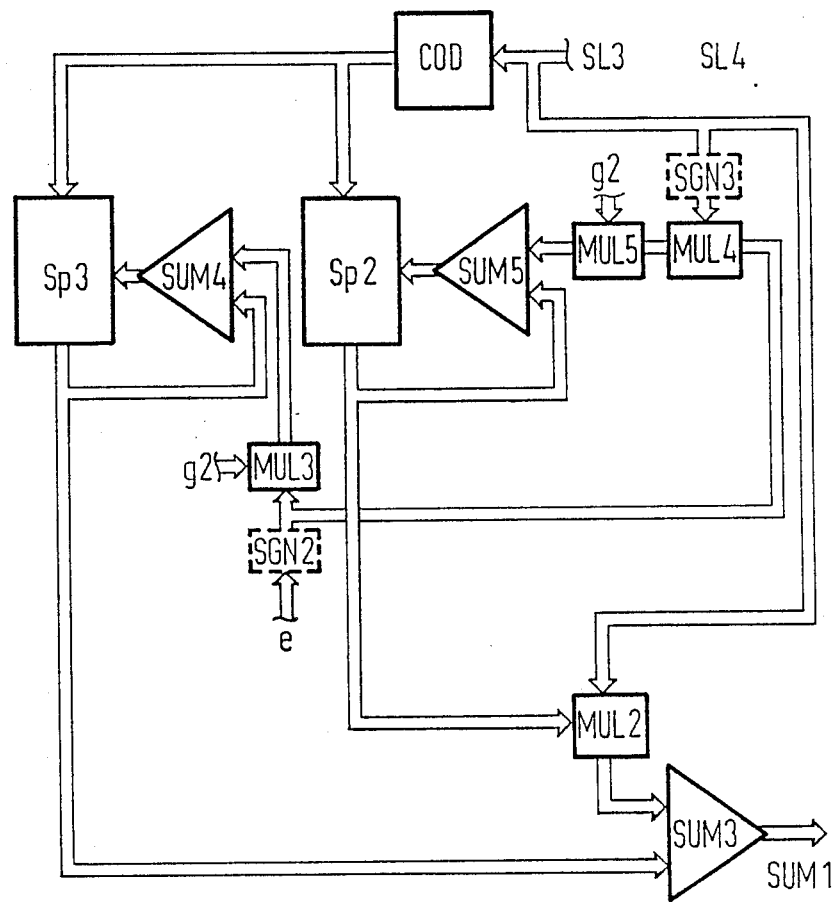
FIG. 3 is a block diagram of a second exemplified embodiment of a nonlinear echo compensator.

FIG. 3 shows a second exemplified embodiment of a nonlinear echo compensator. In this echo compensator, the nonlinear conversion characteristic curve is approximated by a predetermined number M of individual linear segments i.e. a piecewise linear approximation. The input signal to the echo compensator has a value allocated to one of the plurality of predetermined segments For signals within each of these segments, a compensation signal $Y_i$ in the form of $$Y_i = a_j X_i + b_j \quad (2)$$

is formed. Where, $X_i$ is the i-th input signal to the echo compensator and $a_j$, $b_j$ a pair of compensation signal coefficients to b applied within the j-th segment of the input range (where $0 < j \leq M$).

The nonlinear echo compensator shown in FIG. 3 is provided with a coding device COD. The coding device evaluates the input digital signal and emits an address signal representing the segment in which the input signal belongs. If, for example, the number of segments m is a power of 2 (i.e. $2^5 = 32$ or $2^6 = 64$), then a subset of the number of higher-order bits in the input signal is emitted by the coding device COD as an address signal. In this case the number of bits is equal to the exponent of 2. Thus, for example, if the coding device COD emits the three highest-order bits of the bits at the input to the coding device, then a total of eight linear segments can be determined (i.e. M=8).

The address signals emitted by the coding device COD are coupled to address ADDR input terminals of a memory circuit. The memory circuit is provided with two separate memory areas designated as MEM 2 and MEM 3 in FIG. 3. A number of locations corresponding to the number M of linear segments is allocated within each of the memory areas. The memory locations of the memory area MEM2 store the compensation signal coefficients $a_j$ and the memory locations of the memory area MEM3 the compensation signal coefficients $b_j$.

In response to each address signal, respective compensation signal coefficients ($a_j$, $b_j$) is produced at the data output terminals of the two memory areas. The compensation signal coefficient $a_j$ is coupled to a multiplier MUL2 which multiplies the coefficient $a_j$ by the input digital signal $X_i$. The product signal is applied to a first input terminal of an adder SUM3. The compensation signal coefficient $b_j$ is coupled to a second input terminal of adder SUM3. The adder SUM3 forms a summation signal $Y_i = a_j X_i + b_j$ in response to the input signals and supplies this signal as a compensation signal to adder SUM1 (of FIG. 1).

The echo compensator shown in FIG. 3 is provided with a circuit for the adaptive adjustment of the individual pairs of compensation signal coefficients which are stored in the memory areas MEM2 and MEM3. The circuit generates a new pair of coefficients ($a_j$(new), $b_j$(new)) in accordance with the equations:

$$a_j(new) = a_j(old) + g2 \times e \times X_i \quad (3)$$

$$b_j(new) = b_j(old) + g2 \times e. \quad (4)$$

where $a_j$(old), and $b_j$(old) are a pair of compensation coefficients which respectively must be adjusted, g2 is a constant affecting the response of the echo compensation, e is the signal from the output terminal of the subtracter SUB (of FIG. 1), and $X_i$ the input signal to the compensation circuit.

To implement equation (4), an adder SUM4 is provided for adjusting the compensation signal coefficient $b_j$. The compensation signal coefficient $b_j$(old) from the output terminal of the memory MEM3 is coupled to a first input terminal of adder SUM4. The output signal e from subtracter SUB (of FIG. 1) is multiplied by a constant g2 in a multiplier MUL3. An output terminal of multiplier MUL3 is coupled to a second input terminal of adder SUM4. At the output terminal of adder SUM4 there occurs an updated compensation signal coefficient $b_j$(new). This coefficient is coupled to a data input terminal of memory MEM3. The data at the data input terminal is stored in the memory location of the memory MEM3 corresponding to the address signal at the address input terminal of the memory area MEM3. The compensation signal coefficient $b_j$ stored in the memory location is, thus, overwritten.

An adder SUM5 is provided for adjusting the compensation signal coefficient $a_j$ stored in the memory MEM2. The compensation signal coefficient $a_j$(old) occuring at the output terminal of the memory MEM2 is coupled to a first input terminal of adder SUM5. A multiplier MUL4 multiplies the signal e from the output terminal of the subtracter SUB (shown in FIG. 1) by the input signal $X_i$. The resulting product signal is coupled to a further multiplier MUL5 which multiplies the input signal by the constant g2. The resulting product signal, $g2 \times e \times X_i$, is coupled to a second input terminal of adder SUM5. An output terminal of adder SUM5 is coupled to a data input terminal of memory MEM2. The compensation signal coefficient $a_j$ is stored in memory MEM2 in a similar manner as for memory MEM3.

The circuit for adjusting the pairs of compensation signal coefficients ($a_j$ & $b_j$) maY also respond only to the signs of the signal e from subtracter SUB of FIG. 1 and the input signal $X_i$. In such a case, the signals are fed to their respective multipliers MUL3 and MUL4 via respective sign determining circuit illustrated in phantom as SGN2 and SGN3 in FIG. 3.

The echo compensator shown in FIG. 3 offers the advantage that the number of pairs of compensation signal coefficients stored in the memories MEM2 and MEM3 corresponds in number with the number M of linear segments, and that only two arithmetic operations, i.e., a multiplication and an addition, are required for forming each of the compensation signals.

Figure 4:
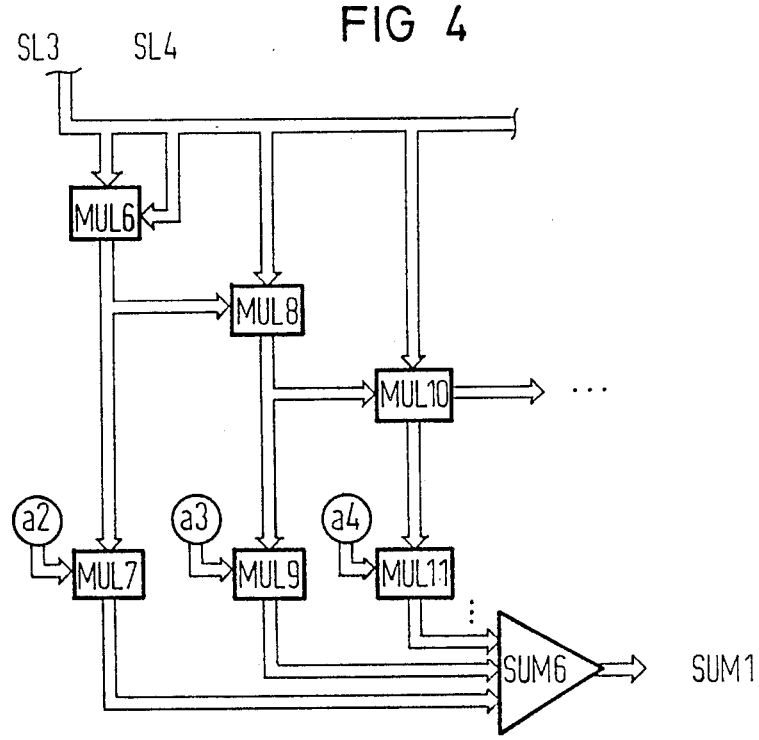
FIG. 4 is a block diagram of a third exemplified embodiment of a nonlinear echo compensator.

FIG. 4 shows a further exemplified embodiment of a nonlinear echo compensator. From the input signals fed to the echo compensator, the echo compensator forms a compensation signal Y according to the equation:

$$Y = a_2 X^2 + a_3 X^3 + \ldots + a_N X^N \quad (5)$$

where, $a_2, \ldots, a_N$ are compensation signal coefficients available to the echo compensator, and X is the signal input to the echo compensator. For the purpose of forming compensation signals of this type, the echo compensator is provided with a plurality of multiplier circuits corresponding with the number of terms contained in the compensation signal Y.

FIG. 4 only shows the multiplication circuits for the first three terms. Each of these multiplication circuits includes two series-connected multipliers. The multipliers allocated to the first term are MUL6 and MUL7. The multipliers allocated to the second and third terms are respectively MUL8 and MUL9; and MUL10 and MUL11.

The first multiplier of each of the series connections serves for the formation of the applicable power of the input signal X Multiplier MUL6 receives at the first and second input terminals, the input signal X and produces the signal $X^2$ at its output terminal. The first multipliers allocated to the remaining terms accept the input signal X at respective first input terminals and, at the second input terminals, the output signal of the first multiplier allocated to the preceding term.

For example, the multiplier MUL8 accepts the input signal X and multiplies it by the signal $X^2$ occuring at the output of the multiplier MUL6, so as to form a signal $X^3$.

The output signals from the first multipliers of each of the individual multiplication circuits is coupled to the associated second multiplier which multiplies said signal by the compensation signal coefficient corresponding to the respective term. For the first term the signal from the first multiplier ($X^2$) is multiplied by $a_2$. For the second term the second multiplier multiplies the $X^3$ signal by $a_3$, etc. Adder SUM6 has respective input terminals coupled to the multiplication circuits, and combines the term signals from the outputs of the multiplication circuits to form a compensation signal Y according to equation (5) and then transmits the compensation signal to the adder SUM1 (of FIG. 1).

A separate circuit for the adaptive adjustment of the associated compensation signal coefficient is allocated to each of the multiplication circuits shown in FIG. 4. Each of these circuits performs an adjustment in the form of $$a_i = g3 \times e \times X^i \quad (6)$$

where, $a_i$ is the compensation signal coefficient which is to be adjusted, g3 is a constant, e the signal occuring at the output of the subtracter SUB (of FIG. 1), and X is the input signal to the echo compensator shown in FIG. 4.

Figure 5:
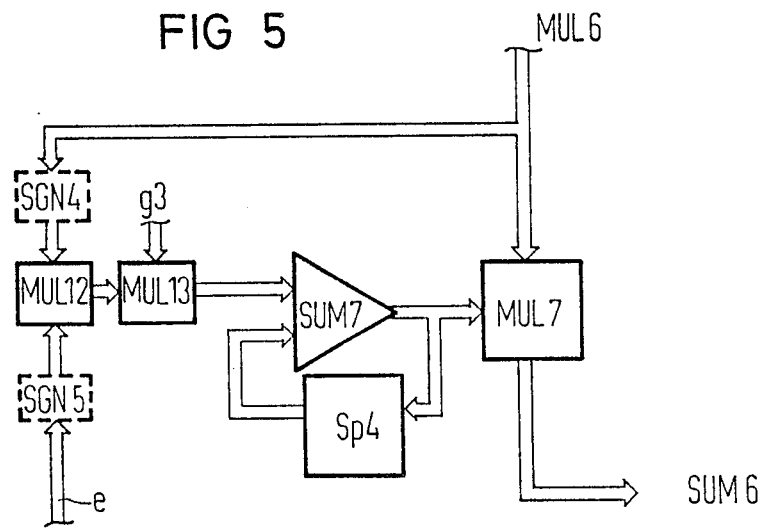
FIG. 5 is a block diagram of a circuit which may be used in the nonlinear echo compensator of FIG. 4, for the adaptive adjustment of compensation signal coefficients.

A circuit configuration which is suitable for this type of adaptive adjustment is illustrated in FIG. 5. The embodiment illustrated in FIG. 5 is an adaptive adjustment circuit for the compensation signal coefficient $a_2$. The circuit for the other coefficients are similar and are not illustrated in detail.

In FIG. 5, two multipliers, MUL12 and MUL13, are serially connected. Multiplier MUL12 is coupled to the output terminal of multiplier MUL6 (of FIG. 4) and multiplies the output signal ($X^2$) by the signal e from the output terminal of subtracter SUB (of FIG. 1). The resulting product signal is coupled to the multiplier MUL13. Multiplier MUL13 forms the product of the constant g3 and the output signal from multiplier MUL 12. The resulting product signal from multiplier MUL13 is coupled to a first input terminal of an adder SUM7. The previous compensation signal coefficient $a_2$ (old), which was previously stored in a memory MEM 4 (for instance, a register cell) is coupled to a second input terminal of the adder SUM7. The output terminal of adder SUM7, produces the updated compensation signal coefficient, $a_2$ (new), and is coupled to a first input terminal of multiplier MUL7, and to an input terminal of memory MEM4 where the previously stored compensation signal coefficient, $a_2$ (old), is overwritten.

The circuit shown in FIG. 5 may alternatively be made responsive to signals representing onlY the signs of said input signals e and $X^2$ for updating the compensation signal coefficient $a_2$. In this case, sign determining circuits are coupled to the input terminals of multiplier MUL12. Sign determining circuits SGN4 and SGN5 are shown in phantom in FIG. 5.

The nonlinear echo compensators shown in FIG. 4 are particularly suitable when compensation signals may be formed from a small number of terms, so that the circuitry may be kept correspondingly low.

Concerning the echo compensators described in FIG. 3, 4 and 5, it must be pointed out that the arithmetic operations to be performed by said compensators may also be performed by a microprocessor system associated with the respective echo compensators.

It should be further pointed out that, in explaining the echo compensators shown in FIG. 2 through 5, the assumption was made that transmitter signals in the form of binary signals occur in the transmitter T shown in FIG. 1, and that the binary signals are thus coupled to the echo compensators as input signals. The echo compensators may, however, be made responsive to any transmitter signals which are in the form of multilevel digital signals. For example, a coding device may be made responsive to the multilevel digital signals for converting them into multibit binary signals which are subsequently used for the formation of compensation signals. Alternatively, it is possible to so design the circuit elements of the echo compensators described in FIG. 2 through 5, so that the compensation signals to be formed may be derived directly from the multilevel digital signals that occur in the transmitter T (of FIG. 1), without prior conversion.

What is claimed:

1. In a system for exchanging digital signals over a duplex channel on a two-wire line, including: an input and an output terminal; means, coupled between said input terminal and said two-wire line, for transmitting a digital data signal to said two-wire line; and means, coupled between said two-wire line and said output terminal, for receiving a signal from said two-wire line, said received signal including a digital data component, an echo component linearly related to said transmitted digital data signal, and an echo component nonlinearly related to said transmitted digital data signal; an adaptive compensation circuit, comprising:

a first echo compensator, responsive to a corrected received signal and said transmitted digital data signal, for providing a first compensation signal for compensating said linearly related echo component;

a second echo compensator, responsive to said corrected received signal and said first compensation signal, for providing a second compensation signal for compensating said nonlinearly related echo component;

means, coupled to said first and second echo compensators, for producing a combined compensation signal; and means, responsive to said received signal and said combined compensation signal, for producing said corrected received signal.

2. In a system for exchanging digital signals over a duplex channel on a two-wire line, including: an input and an output terminal; means, coupled between said input terminal and said two-wire line, for transmitting a digital data signal to said two-wire line; means, coupled between said two-wire line and said output terminal, for receiving a signal from said two-wire line, said received signal including a digital data component, an echo component linearly related to said transmitted digital data signal, and an echo component nonlinearly related to said transmitted digital data signal; and adaptive compensation circuit, comprising:

a first echo compensator, responsive to a corrected received signal and said transmitted digital data signal, for providing a first compensation signal for compensating said linearly related echo component;

a second echo compensator, responsive to said corrected received signal and said first compensation signal, for providing a second compensation signal for compensating said nonlinearly related echo component;

means, coupled to said first and second echo compensators, for producing a combined compensation signal; and means, responsive to said received signal and said combined compensation signal, for producing said corrected received signal; wherein said second echo compensator comprises:

a memory, having an address input terminal coupled to said first echo compensator, and a plurality of locations containing nonlinear compensation signals corresponding to said first compensation signal; and an adaptive adjustment circuit, for updating previously stored nonlinear compensation signals, in response to said corrected received signal, and storing said updated nonlinear compensation signals in said memory.

3. In a system for exchanging digital signals over a duplex channel on a two-wire line, including: an input and an output terminal; means, coupled between said input terminal and said two-wire line, for transmitting a digital data signal to said two-wire line; means, coupled between said two-wire line and said output terminal, for receiving a signal from said two-wire line, said received signal including a digital data component, an echo component linearly related to said transmitted digital data signal, and an echo component nonlinearly related to said transmitted digital data signal; an adaptive compensation circuit, comprising:

a first echo compensator, responsive to a corrected received signal and said transmitted digital data signal, for providing a first compensation signal for compensating said linearly related echo component;

a second echo compensator, responsive to said corrected received signal and said first compensation signal, for providing a second compensation signal for compensating said nonlinearly related echo component;

means, coupled to said first and second echo compensators, for producing a combined compensation signal; and means, responsive to said received signal and said combined compensation signal, for producing said corrected received signal; wherein said second echo compensator comprises:

a coding device for selecting a segment of an echo compensation curve in response to said first compensation signal and producing an address signal representative of said selected segment;

a compensation signal generator, including a memory having an address input terminal responsive to said address signal and a data output terminal for producing a pair $a_i, b_i$ of compensation coefficients, for producing said second compensation signal, designated Y, according to an equation:

$$Y = a_i X + b_i$$

where X is said first compensation signal; and an adaptive adjustment circuit for updating said compensation coefficient $b_i$ in response to said corrected received signal, updating said compensation signal coefficient $a_i$ in response to said corrected received signal and said first compensation signal, and storing said updated pair of compensation signal coefficients in said memory.

4. The system of claim 3, wherein said compensation signal generator comprises:

a first memory area in said memory, having an output terminal and a plurality of memory locations allocated for storing said compensation signal coefficients $a_i$;

a second memory area in said memory, having an output terminal and a plurality of memory locations allocated for storing said compensation signal coefficients $b_i$;

a multiplier, having a first input terminal coupled to said output terminal of said first memory area, a second input terminal responsive to said first compensation signal, and an output terminal; and an adder, having a first input terminal coupled to said output terminal of said multiplier, a second input terminal coupled to said output terminal of said second memory area, and an output terminal for producing said second compensation signal.

5. The system of claim 4, wherein:

said first compensation signal includes a predetermined number of bits; and said coding device produces a signal consisting of at least a predetermined number of higher-order bits of said first compensation signal.

6. In a system for exchanging digital signals over a duplex channel on a two-wire line, including: an input and an output terminal; means, coupled between said input terminal and said two-wire line, for transmitting a digital data signal to said two-wire line; means, coupled between said two-wire line and said output terminal, for receiving a signal from said two-wire line, said received signal including a digital data component, an echo component linearly related to said transmitted digital data signal, and an echo component nonlinearly related to said transmitted digital data signal; an adaptive compensation circuit, comprising:

a first echo compensator, responsive to a corrected received signal and said transmitted digital data signal, for providing a first compensation signal for compensating said linearly related echo component;

a second echo compensator, responsive to said corrected received signal and said first compensation signal, for providing a second compensation signal for compensating said nonlinearly related echo component;

means, coupled to said first and second echo compensators, for producing a combined compensation signal; and means, responsive to said received signal and said combined compensation signal, for producing said corrected received signal; wherein said second echo compensator comprises:

a compensation signal generator, responsive to said first compensation signal, for producing said second compensation signal, designated Y, according to an equation:

$$Y = a_2 X^2 + \ldots + a_N X^N$$

wherein $a_2, \ldots, a_N$ represent compensation signal coefficients and X said first compensation signal, and including:

a plurality of multipliers, each associated with a respective term in said equation, each having a first input terminal responsive to said first compensation signal, a second input terminal responsive to a signal having the value of the coefficient of the associated term of said equation and an output terminal;

an adder, having respective input terminals coupled to said output terminals of said multipliers, and an output terminal producing said second compensation signal; and an adaptive adjustment circuit for updating each of said compensation signal coefficients in response to said corrected received signal and said first compensation signal.

7. In a system for exchanging digital signals over a duplex channel on a two-wire line, including: an input and an output terminal; means, coupled between said input terminal and said two-wire line, for transmitting successive data symbols to said two-wire line; means, coupled between said two-wire line and said output terminal, for receiving a signal from said two-wire line, said received signal including a digital data component, an echo component linearly related to said transmitted data symbols, and an echo component nonlinearly related to said transmitted data symbols; and a circuit element which generates said nonlinearly related echo component; an adaptive compensation circuit, comprising:

a first echo compensator, responsive to a corrected received signal and said transmitted data symbols, for providing a first compensation signal for compensating said linearly related echo component;

a second echo compensator, responsive to said corrected received signal and said circuit element, for providing a second compensation signal for compensating said nonlinearly related echo component;

means, coupled to said first and second echo compensators, for producing a combined compensation signal; and means, responsive to said received signal and said combined compensation signal, for producing said corrected received signal; wherein said second echo compensator comprises:

a coding device for selecting a segment of an echo compensation curve in response to a current symbol from said transmitter and the (N−1) preceding symbols and producing an address signal representative of said selected segment;

a compensation signal generator, including a memory having an address input terminal responsive to said address signal and a data output terminal for producing a pair $a_i$, $b_i$ of compensation coefficients, for producing said second compensation signal, designated Y, according to an equation:

$$Y = a_i X + b_i$$

where X is said current symbol from said transmitter and said (N−1) preceding symbols; and an adaptive adjustment circuit for updating said compensation coefficient $b_i$ in response to said corrected received signal, updating said compensation signal coefficient $a_i$ in response to said corrected received signal and said current symbol from said transmitter and the (N−1) preceding symbols, and storing said updated pair of compensation signal coefficients in said memory.

8. The system of claim 7, wherein said compensation signal generator comprises:
   a first memory area in said memory, having an output terminal and a plurality of memory locations allocated for storing said compensation signal coefficients $a_i$;
   a second memory area in said memory, having an output terminal and a plurality of memory locations allocated for storing said compensation signal coefficients $b_i$;
   a multiplier, having a first input terminal coupled to said output terminal of said first memory area, a second input terminal responsive to said current symbol from said transmitter and said (N−1) preceding symbols, and an output terminal; and
   an adder, having a first input terminal coupled to said output terminal of said multiplier, a second input terminal coupled to said output terminal of said second memory area, and an output terminal for producing said second compensation signal.

9. The system of claim 8, wherein:
   said current symbol from said transmitter and said (N−1) preceding symbols is represented by a multibit digital signal which includes a predetermined number of bits; and
   said coding device produces a signal consisting of at least a predetermined number of higher-order bits of said signal representing said current symbol from said transmitter and said (N−1) preceding symbols.

10. In a system for exchanging digital signals over a duplex channel on a two-wire line, including: an input and an output terminal; means, coupled between said input terminal and said two-wire line, for transmitting successive data symbols to said two-wire line; means, coupled between said two-wire line and said output terminal, for receiving a signal from said two-wire line, said received signal including a digital data component, an echo component linearly related to said transmitted data symbols, and an echo component nonlinearly related to said transmitted data symbols; and a circuit element which generates said nonlinearly related echo component; an adaptive compensation circuit, comprising:
   a first echo compensator, responsive to a corrected received signal and said transmitted data symbols, for providing a first compensation signal for compensating said linearly related echo component;
   a second echo compensator, responsive to said corrected received signal and said circuit element, for providing a second compensation signal for compensating said nonlinearly related echo component;
   means, coupled to said first and second echo compensators, for producing a combined compensation signal; and
   means, responsive to said received signal and said combined compensation signal, for producing said corrected received signal; wherein said second echo compensator comprises:
   a compensation signal generator, responsive to a current symbol from said transmitter and the (N−1) preceding symbols, for producing said second compensation signal, designated Y, according to an equation:

$$Y = a_2 X^2 + \ldots + a_N X^N$$

wherein $a_2, \ldots, a_N$ represent compensation signal coefficients and X said current symbol from said transmitter and the (N−1) preceding symbols, and including:
   a plurality of multipliers, each associated with a respective term in said equation, each having a first input terminal responsive to said current symbol from said transmitter and the (N−1) preceding symbols, a second input terminal responsive to a signal having the value of the coefficient of the associated term of said equation and an output terminal;
   an adder, having respective input terminals coupled to said output terminals of said multipliers, and an output terminal producing said second compensation signal; and
   an adaptive adjustment circuit for updating each of said compensation signal coefficients in response to said corrected received signal and said current symbol from said transmitter and the (N−1) preceding symbols.

11. In a system for exchanging digital signals over a duplex channel on a two-wire line, including: an input and an output terminal; means, coupled between said input terminal and said two-wire line for transmitting a digital data signal to said two-wire line; means, coupled between said two-wire line and said output terminal for receiving a signal from said two-wire line, said received signal including a digital data component, an echo component linearly related to said transmitted digital data signal, and a first echo component and a second echo component nonlinearly related to said transmitted digital data signal respectively; and a circuit element which generates said second nonlinearly related echo component; an adaptive compensation circuit, comprising:
   a first echo compensator, responsive to a corrected received signal and said transmitted digital data signal, for providing a first compensation signal for compensating said linearly related echo component;
   a second echo compensator, responsive to said corrected received signal and said first compensation signal, for providing a second compensation signal for compensating said first nonlinearly related echo component;
   a third echo compensator, responsive to said corrected received signal and said circuit element, for providing a third compensation signal for compensating said second nonlinearly related echo component;
   means, coupled to said first, second and third echo compensators, for producing a combined compensation signal; and
   means responsive to said received signal and said combined compensation signal, for producing said corrected received signal.

* * * * *